(12) United States Patent
Endo

(10) Patent No.: US 11,168,589 B2
(45) Date of Patent: Nov. 9, 2021

(54) INTERNAL COMBUSTION ENGINE

(71) Applicant: TOYOTA JIDOSHA KABUSHIKI KAISHA, Toyota (JP)

(72) Inventor: Yoshiki Endo, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 53 days.

(21) Appl. No.: 16/441,063

(22) Filed: Jun. 14, 2019

(65) Prior Publication Data

US 2020/0032679 A1 Jan. 30, 2020

(30) Foreign Application Priority Data

Jul. 25, 2018 (JP) .............................. JP2018-139050

(51) Int. Cl.
| | | |
|---|---|---|
| *F01L 1/344* | (2006.01) | |
| *F16H 7/06* | (2006.01) | |
| *F01L 1/053* | (2006.01) | |
| *F01L 1/02* | (2006.01) | |

(52) U.S. Cl.
CPC .............. *F01L 1/3442* (2013.01); *F01L 1/022* (2013.01); *F01L 1/053* (2013.01); *F16H 7/06* (2013.01); *F01L 2001/0537* (2013.01); *F01L 2001/34426* (2013.01)

(58) Field of Classification Search
CPC ......... F01L 2001/054; F01L 2001/0537; F01L 2001/34426; F01L 2001/34423; F16H 7/06; F16H 7/02; F16H 7/023; F16H 2007/026
USPC ...................... 123/90.15, 90.16, 90.17, 90.18
See application file for complete search history.

(56) References Cited

U.S. PATENT DOCUMENTS

| | | | | |
|---|---|---|---|---|
| 2010/0192887 | A1* | 8/2010 | Iwata | F01M 11/02 123/90.17 |
| 2011/0277726 | A1* | 11/2011 | Hicks | F01M 9/08 123/196 R |
| 2018/0010492 | A1* | 1/2018 | Shirakawa | F01M 1/02 |
| 2018/0223969 | A1* | 8/2018 | Konno | F16H 7/18 |
| 2018/0238205 | A1* | 8/2018 | Koide | F01P 3/02 |

FOREIGN PATENT DOCUMENTS

| | | |
|---|---|---|
| JP | 2016-128682 A | 7/2016 |
| JP | 2016128682 A * | 7/2016 |

* cited by examiner

*Primary Examiner* — Charles G Freay
*Assistant Examiner* — Kelsey L Stanek
(74) *Attorney, Agent, or Firm* — Oliff PLC

(57) ABSTRACT

An internal combustion engine includes exhaust-side and intake-side variable valve timing mechanisms, an oil passage defined in the cylinder head, an exhaust-side connection passage that branches from the oil passage to conduct oil to the exhaust-side variable valve timing mechanism, and an intake-side connection passage that branches from the oil passage to conduct oil to the intake-side variable valve timing mechanism. The connection passage that conducts oil to one of the exhaust-side variable valve timing mechanism and the intake-side variable valve timing mechanism that has a greater amount of oil leakage when oil having the same pressure is supplied to the variable valve timing mechanisms to operate the variable valve timing mechanisms is located at a downstream side in the oil passage of the connection passage that conducts oil to the variable valve timing mechanism that has a smaller amount of oil leakage.

4 Claims, 5 Drawing Sheets

INTERNAL COMBUSTION ENGINE

BACKGROUND

1. Field

The following description relates to an internal combustion engine.

2. Description of Related Art

A typical internal combustion engine has an intake camshaft and an exhaust camshaft arranged parallel to each other on the top of a cylinder head. An intake-side variable valve timing mechanism is attached to an end of the intake camshaft. An exhaust-side variable valve timing mechanism is attached to an end of the exhaust camshaft. Furthermore, a main oil passage, through which oil flows, is defined in the cylinder head. The main oil passage is connected to an intake-side connection passage configured to supply oil to the intake-side variable valve timing mechanism. Also, a section of the main oil passage that is on the downstream side of the intake-side connection passage is connected to an exhaust-side connection passage configured to supply oil to the exhaust-side variable valve timing mechanism.

Oil pumped by an oil pump is supplied from the main oil passage of the cylinder head to the intake-side variable valve timing mechanism via the intake-side connection passage, and also supplied from the main oil passage to the exhaust-side variable valve timing mechanism via the exhaust-side connection passage. In accordance with the operating state of the internal combustion engine, oil is supplied to or drained from the intake-side variable valve timing mechanism and the exhaust-side variable valve timing mechanism. Accordingly, the phases of the intake camshaft and the exhaust camshaft with respect to the crank angle are changed, so that the opening/closing timings of the intake valve and the exhaust valve are advanced or retarded.

In the above-described internal combustion engine, the oil supplied to the intake-side variable valve timing mechanism and the exhaust-side variable valve timing mechanism may leak to the outside from inside the variable valve timing mechanisms. Thus, the hydraulic pressure in the downstream side of the main oil passage is reduced by the amount of the hydraulic pressure reduction in the upstream side of the main oil passage. This may cause hydraulic pressure insufficiency for one of the intake-side variable valve timing mechanism and the exhaust-side variable valve timing mechanism that is located in the downstream side of the main oil passage.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an internal combustion engine is provided that includes a cylinder head, an exhaust camshaft built into the cylinder head, an intake camshaft built into the cylinder head, an exhaust-side variable valve timing mechanism that is attached to an end of the exhaust camshaft and changes an opening/closing timing of an exhaust valve by supply and drainage of oil, an intake-side variable valve timing mechanism that is attached to an end of the intake camshaft and changes an opening/closing timing of an intake valve by supply and drainage of oil, an oil passage that is defined in the cylinder head and through which oil pumped up by an oil pump flows, an exhaust-side connection passage that is connected to the oil passage and branches from the oil passage to conduct oil to the exhaust-side variable valve timing mechanism, and an intake-side connection passage that is connected to the oil passage and branches from the oil passage to conduct oil to the intake-side variable valve timing mechanism. The connection passage that conducts oil to one of the exhaust-side variable valve timing mechanism and the intake-side variable valve timing mechanism that has a greater amount of oil leakage when oil having the same pressure is supplied to the variable valve timing mechanisms to operate the variable valve timing mechanisms is located at a downstream side in the oil passage of the connection passage that conducts oil to the variable valve timing mechanism that has a smaller amount of oil leakage.

According to the above-described configuration, the pressure of oil conducted to the variable valve timing mechanism located in the downstream side of the oil passage is higher than that in a case in which the connection passage configured to conduct oil to the variable valve timing mechanism that has the greater amount of oil leakage is provided in the upstream side. This limits hydraulic pressure insufficiency in the variable valve timing mechanism located in the downstream side of the oil passage.

In the above-described configuration, the internal combustion engine further includes an exhaust-side cam sprocket fixed to the end of the exhaust camshaft, an intake-side cam sprocket fixed to the end of the intake camshaft, a crank sprocket fixed to an end of the crankshaft, and a timing chain that is looped over the exhaust-side cam sprocket, the intake-side cam sprocket, and the crank sprocket, and transmits rotational torque. Of the exhaust side and the intake side, the side at which the variable valve timing mechanism having the smaller amount of oil leakage is provided is defined as an upstream side, and the side at which the variable valve timing mechanism having the greater amount of oil leakage is provided is defined as a downstream side. The cam sprocket in the downstream side is located farther from the crank sprocket than the cam sprocket in the upstream side in a traveling direction of the timing chain.

According to the above-described configuration, the tension of the timing chain is higher at the cam sprocket in the downstream side, where the amount of oil leakage is great, than at the cam sprocket in the upstream side. Therefore, of the two cam sprockets, the cam sprocket that is relatively prone to wear is readily lubricated by the oil leaking from the variable valve timing mechanism.

In the above-described configuration, the internal combustion engine further includes oil control valves that are respectively connected to the exhaust-side variable valve timing mechanism and the intake-side variable valve timing mechanism to control supply and discharge of oil. The oil control valve connected to the variable valve timing mechanism that has the greater amount of oil leakage is inserted in a center in a radial direction of the corresponding variable valve timing mechanism.

When inserted in the center of the variable valve timing mechanism, the oil control valve improves the responsivity of the variable valve timing mechanism, but causes oil to leak more easily. In the above-described configuration, the oil control valve is inserted at least in the center of the variable valve timing mechanism that has the greater amount of oil leakage, so that the amount of oil leakage of this variable valve timing mechanism will be relatively high. On the premise of this configuration, providing the connection passage configured to supply oil to the variable valve timing mechanism that has the greater amount of oil leakage on the downstream side of the variable valve timing mechanism that has the smaller amount of oil leakage is significantly advantageous in limiting hydraulic pressure insufficiency of oil in the oil passage.

In the above-described configuration, the internal combustion engine further includes a jet connection passage that conducts oil to an oil jet that is arranged in the oil passage and sprays oil. The jet connection passage is located at the upstream side in the oil passage of the connection passage that conducts oil to one of the exhaust-side variable valve timing mechanism and the intake-side variable valve timing mechanism that has the greater amount of oil leakage.

Since oil is sprayed from the oil jet, a low hydraulic pressure of the oil conducted to the oil jet may hamper the oil from being injected vigorously. According to the above-described configuration, the jet passage is supplied with the hydraulic pressure before it is reduced by the variable valve timing mechanism that has the greater amount of oil leakage. Therefore, sufficient hydraulic pressure is ensured as the hydraulic pressure of the oil conducted to the oil jet.

In another general aspect, an internal combustion engine is provided that includes a cylinder head, an exhaust camshaft built into the cylinder head, an intake camshaft built into the cylinder head, an exhaust-side variable valve timing mechanism that is attached to an end of the exhaust camshaft and changes an opening/closing timing of an exhaust valve by supply and drainage of oil, an intake-side variable valve timing mechanism that is attached to an end of the intake camshaft and changes an opening/closing timing of an intake valve by supply and drainage of oil, an oil passage that is defined in the cylinder head and through which oil pumped up by an oil pump flows, an exhaust-side connection passage that is connected to the oil passage and branches from the oil passage to conduct oil to the exhaust-side variable valve timing mechanism, and an intake-side connection passage that is connected to the oil passage and branches from a section of the oil passage at a downstream side of the exhaust-side connection passage to conduct oil to the intake-side variable valve timing mechanism. When oil having the same pressure is supplied to the exhaust-side variable valve timing mechanism and the intake-side variable valve timing mechanism to operate the variable valve timing mechanisms, an amount of oil leakage in the intake-side variable valve timing mechanism is greater than that in the exhaust-side variable valve timing mechanism.

According to the above-described configuration, the pressure of oil conducted to the intake-side variable valve timing mechanism located in the downstream side of the oil passage is higher than that in a case in which the intake-side connection passage configured to conduct oil to the intake-side variable valve timing mechanism that has the greater amount of oil leakage is provided in the upstream side. This limits hydraulic pressure insufficiency in the intake-side variable valve timing mechanism located in the downstream side of the oil passage.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

An internal combustion engine E according to an embodiment will now be described with reference to the drawings. In the following description, it is assumed that the internal combustion engine E is mounted on a vehicle, and the vertical direction of the vehicle is defined as the vertical direction of the internal combustion engine E.

Figure 1:
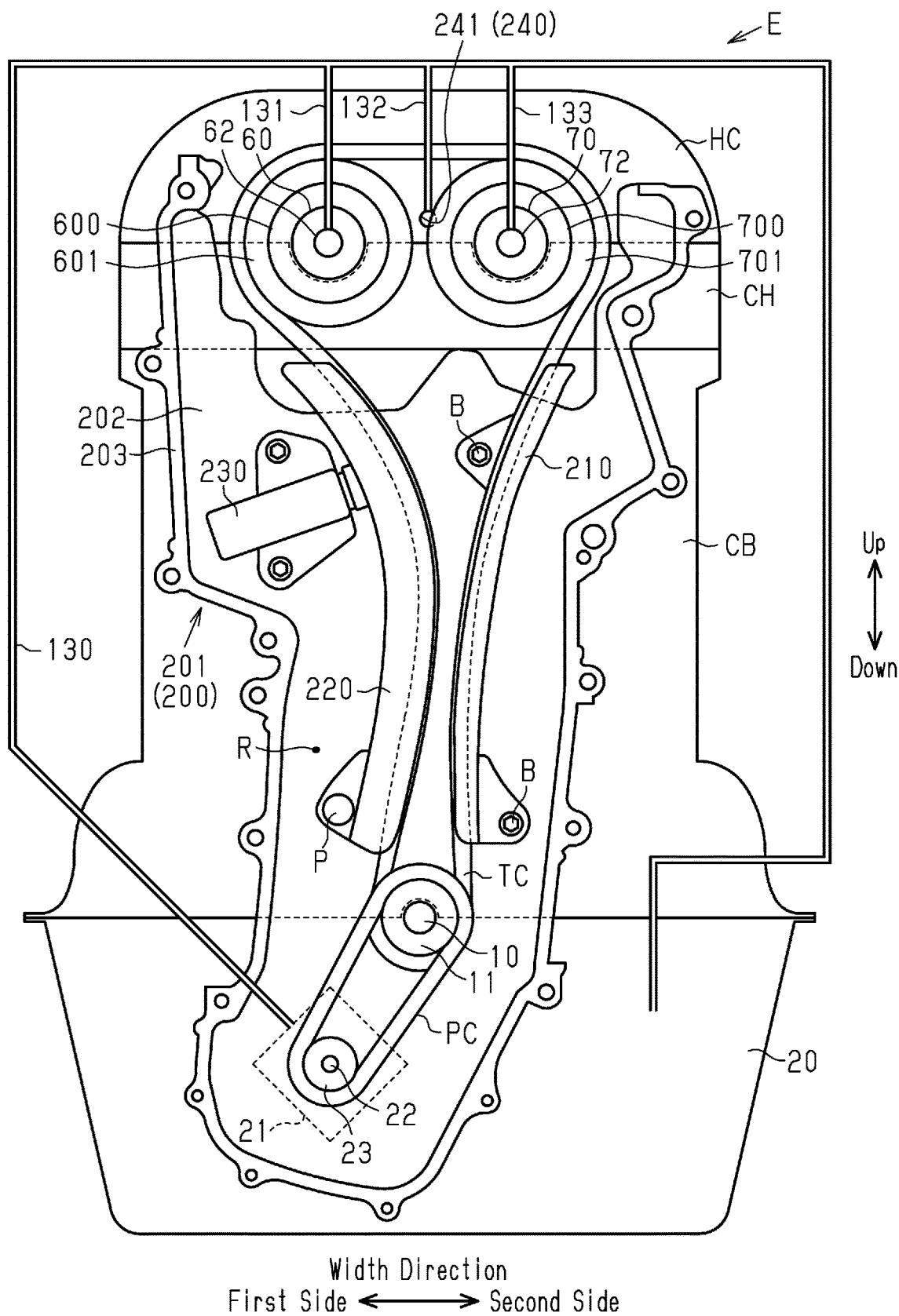
FIG. 1 is a schematic side view of an internal combustion engine.
Figure 2:
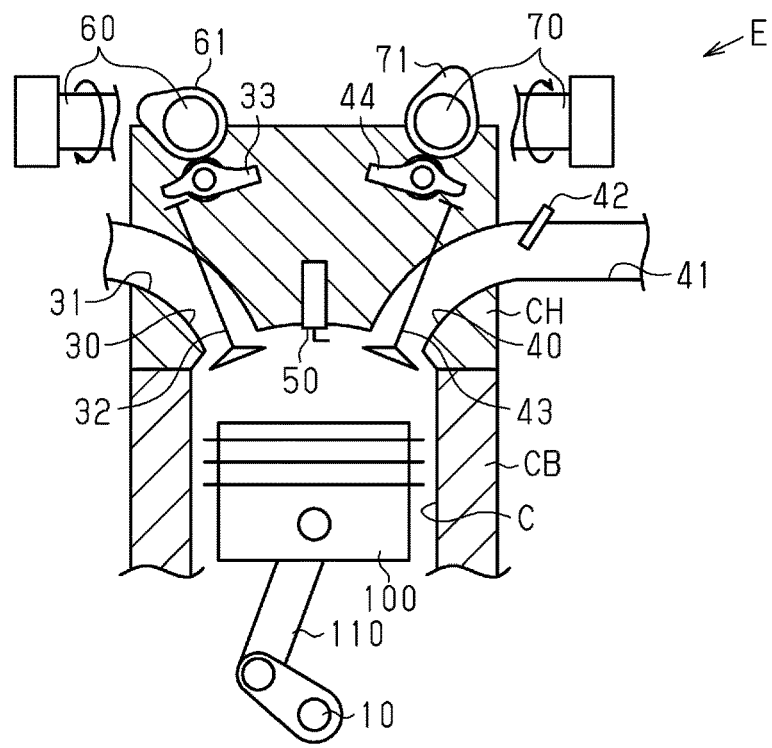
FIG. 2 is a schematic diagram of the internal combustion engine.

First, the schematic configuration of the internal combustion engine E of the present embodiment will be described with reference to FIGS. 1 and 2. As shown in FIG. 1, the internal combustion engine E includes a cylinder block CB, which has a rectangular parallelepiped shape as a whole. As shown in FIG. 2, cylinders C are defined inside the cylinder block CB. For simplicity, only one of the cylinders C is shown in FIG. 2. Each cylinder C accommodates a piston 100, which is configured to reciprocate in the cylinder C. The piston 100 is coupled to a crankshaft 10 via a connecting rod 110.

Main caps (not shown) are fixed to the lower end of the cylinder block CB. As shown in FIG. 1, the crankshaft 10 is rotationally supported between the cylinder block CB and the main caps. The crankshaft 10 extends through the cylinder block CB, and the opposite ends of the crankshaft 10 protrude out of the cylinder block CB. A crank sprocket 11 is fixed to a first end in the axial direction of the crankshaft 10, that is, the end on the front side of the sheet of FIG. 10. In FIG. 1, the crank sprocket 11 is schematically illustrated as a circle.

A box-shaped oil pan 20 with a closed bottom is attached to the lower end of the cylinder block CB to cover the crankshaft 10 from below. The oil pan 20 contains oil for lubricating various parts of the internal combustion engine E and for operating various Mechanisms. The oil pan 20 also accommodates an oil pump 21 configured to pump the oil contained in the oil pan 20, The oil pump 21 includes an input shaft 22, the end of which protrudes out of the internal combustion engine E. Further, a substantially disk-shaped oil pump sprocket 23 is fixed to the end of the input shaft 22 of the oil pump 21. In FIG. 1, the oil pump sprocket 23 is schematically illustrated as a circle.

A pump chain PC is looped over the crank sprocket 11 and the oil pump sprocket 23. Thus, when the crankshaft 10 of the internal combustion engine E rotates, the turning force is transmitted to the oil pump 21 through the crank sprocket 11, the pump chain PC, and the oil pump sprocket 23.

A rectangular parallelepiped cylinder head CH is fixed to the upper end of the cylinder block CB. As shown in FIG. 2, an exhaust port 30 and an intake port 40 are defined in the cylinder head CH. The exhaust port 30 is connected to an exhaust pipe 31 that discharges exhaust gas from the exhaust port 30. The intake port 40 is connected to an intake pipe 41 that conducts intake air to the intake port 40. A fuel injection valve 42 that injects fuel to the intake port 40 is attached to the intake pipe 41. Also, in the cylinder head CH, an ignition plug 50 that ignites fuel is installed at a position facing each cylinder C of the cylinder block CB.

Camshaft caps (not shown) are fixed to the upper end of the cylinder head. An exhaust camshaft 60 and an intake camshaft 70 are rotationally supported between the cylinder head CH and the camshaft caps. The exhaust camshaft 60 has exhaust cams 61 configured to convert rotational motion of the exhaust camshaft 60 into linear reciprocation. Also, the intake camshaft 70 has intake cams 71 configured to convert rotational motion of the intake camshaft 70 into linear reciprocation.

As shown in FIG. 1, a direction that is orthogonal to both of the vertical direction of the internal combustion engine E and the axial direction of the crankshaft 10, that is, the horizontal direction in FIG. 1, is referred to as the width direction of the internal combustion engine E. In this case, the exhaust camshaft 60 is located on one side in the width direction, that is, on a first side, of the central axis of the crankshaft 10, and the intake camshaft 70 is on the other side in the width direction, that is, on a second side of the crankshaft 10. Ends of the exhaust camshaft 60 and the intake camshaft 70 on one side, that is, first ends of the camshafts 60, 70 protrude out of the cylinder head CH. Also, the exhaust camshaft 60 and the intake camshaft 70 extend parallel to the central axis of the crankshaft 10.

As shown in FIG. 2, an exhaust valve 32 configured to open and close the exhaust port 30 and an intake valve 43 configured to open and close the intake port 40 are attached to the cylinder head CH. Rotational motion of the exhaust camshaft 60 is converted into linear reciprocation and transmitted to the exhaust valve 32 via the exhaust cam 61 and an exhaust-side drive lever 33. Likewise, rotational motion of the intake camshaft 70 is converted into linear reciprocation and transmitted to intake valve 43 via the intake cam 71 and an intake-side drive lever 44.

As shown in FIG. 1, a substantially disk-shaped exhaust-side variable valve timing mechanism 600 is attached to the first end of the exhaust camshaft 60, that is, the end extending toward the viewer of FIG. 1. A substantially cylindrical bolt-type oil control valve 62 is inserted in the central part in the radial direction of the exhaust-side variable valve timing mechanism 600. A portion of the distal end of the oil control valve 62 is inserted in the exhaust camshaft 60. The oil control valve 62 thus fixes the exhaust-side variable valve timing mechanism 600 to the exhaust camshaft 60. The exhaust-side variable valve timing mechanism 600 includes an exhaust-side cam sprocket 601. The exhaust-side variable valve timing mechanism 600 changes the opening/closing timing of the exhaust valve 32 by supply and drainage of oil. In FIG. 1, the exhaust-side cam sprocket 601 is schematically illustrated as a circle.

A substantially disk-shaped intake-side variable valve timing mechanism 700 is attached to the first end of the intake camshaft 70. A substantially cylindrical bolt-type oil control valve 72 is inserted in the central part in the radial direction of the intake-side variable valve timing mechanism 700. A portion of the distal end of the oil control valve 72 is inserted in the intake camshaft 70. The oil control valve 72 thus fixes the intake-side variable valve timing mechanism 700 to the intake camshaft 70. The intake-side variable valve timing mechanism 700 includes an intake-side cam sprocket 701. The intake-side variable valve timing mechanism 700 changes the opening/closing timing of the intake valve 43 by supply and drainage of oil. In FIG. 1, the intake-side cam sprocket 701 is schematically illustrated as a circle.

A cylinder head cover HC is fixed to the upper end of the cylinder head CH. The cylinder head cover HC covers most of the exhaust camshaft 60, most of the intake camshaft 70, and the camshaft caps (not shown) from above.

In the internal combustion engine E, a timing chain TC is looped over the crank sprocket 11, the exhaust-side cam sprocket 601, and the intake-side cam sprocket 701. In the present embodiment, the crank sprocket 11 rotates clockwise when viewed from the first side in the axial direction of the crankshaft 10 shown in FIG. 1. The timing chain TC, which is dispensed from the crank sprocket 11, travels so as to return to the crank sprocket 11 again via the exhaust-side cam sprocket 601 and the intake-side cam sprocket 701.

A chain case 200 that encloses the timing chain TC and the pump chain PC is attached to the outer surface on the first side in the axial direction of the crankshaft 10 in the cylinder block CR The chain case 200 is configured by a first case member 201 attached to the internal combustion engine E, and a second case member (not shown), which has substantially the same shape in plan view as the first case member 201. The first case member 201 and the second case member are arranged to face each other. Specifically, the end face of the second case member abuts on the end face of the first case member 201 on the opposite side from the internal combustion engine E. A chain chamber R configured to accommodate the timing chain TC and the pump chain PC is defined between the first case member 201 and the second case member.

The first case member 201 of the chain case 200 includes a plate-shaped main wall 202 and an outer edge wall 203, which extends from the edge of the main wall 202 toward the first side in the axial direction of the crankshaft 10. The shape of the main wall 202 in plan view is designed in accordance with the paths of the timing chain TC and the pump chain PC. In the present embodiment, the main wall 202 is elongated in the vertical direction as a whole, with the upper end extending to the cylinder head cover HC and the lower end extending to the oil pan 20. The surface of the main wall 202 on the second side in the axial direction of the crankshaft 10 is fixed to the surface of the cylinder block CB on the first side in the axial direction of the crankshaft 10. Further, the main wall 202 has cutouts and holes configured to receive the crank sprocket 11, the exhaust-side cam sprocket 601, and the intake-side cam sprocket 701.

A fixed guide 210, which guides the travel of the timing chain TC, is fixed to the surface of the main wall 202 of the first case member 201 on the first side in the axial direction of the crankshaft 10. The fixed guide 210 is located between the crank sprocket 11 and the intake-side cam sprocket 701. The fixed guide 210 has an elongated and slightly curved shape, that is, a bow shape. The outer side of the curve faces the center in the width direction of the internal combustion engine E. The timing chain TC is in contact with the outer surface of the curve of the fixed guide 210. The fixed guide 210 is fixed to the cylinder block CB with bolts B on the upper and lower sides in the longitudinal direction.

A swing guide 220, which guides the travel of the timing chain TC, is fixed to the surface of the main wall 202 of the first case member 201 on the first side in the axial direction of the crankshaft 10. The swing guide 220 is located between the crank sprocket 11 and the exhaust-side cam sprocket 601. The swing guide 220 has an elongated and curved shape, that is, a bow shape. The outer side of the curve faces the center in the width direction of the internal combustion engine E. That is, the outer side of the curve of the swing guide 220 faces the outer side of the curve of the fixed guide 210. A pin P is inserted into the swing guide 220 on the lower side in the longitudinal direction. The swing guide 220 is attached to the cylinder block CB so as to be able to swing about the pin P. The timing chain TC is in contact with the outer surface of the curve of the swing guide 220.

A tensioner 230, which swings the swing guide 220 by pressing the swing guide 220, is fixed to the main wall 202 of the first case member 201. In the width direction of the internal combustion engine E, the tensioner 230 is located on one side, that is, on the first side of the timing chain TC, which is looped over the crank sprocket 11 and the exhaust-side cam sprocket 601. The distal end of the tensioner 230 abuts against the inner side of the curve of the swing guide 220.

An oil jet 240, which sprays oil, opens in the surface of the cylinder head CH on the first side in the axial direction of the crankshaft 10. The oil jet 240 has an opening 241, which is located, in the internal combustion engine E, between the exhaust-side cam sprocket 601 and the intake-side cam sprocket 701 as viewed from the first side in the axial direction of the crankshaft 10.

Figure 3:
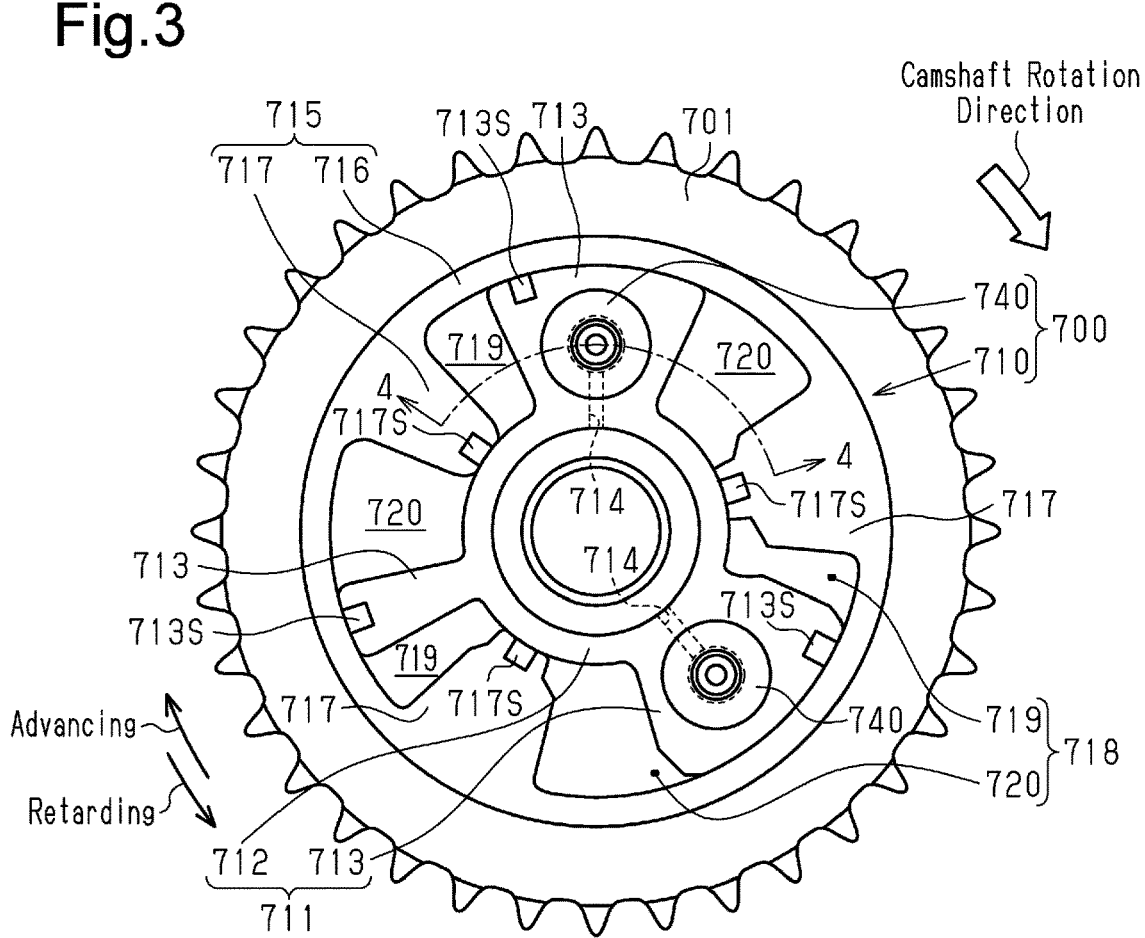
FIG. 3 is a plan view schematically showing the internal structure of an intake-side variable valve timing mechanism.

The intake-side variable valve timing mechanism 700 of the present embodiment will now be described with reference to FIGS. 3 to 5. As shown in FIG. 3, when viewed from the first side in the axial direction of the intake camshaft 70, the intake-side variable valve timing mechanism 700 has a substantially circular shape. The intake-side variable valve timing mechanist 700 basically includes a timing varying portion 710 and an intermediate locking portion 740. The timing varying portion 710 changes the valve timing, or the opening/closing timing, of the intake valve 43. The intermediate locking portion 740 retains the valve timing of the intake valve 43 at intermediate timing between the most retarded timing and the most advanced timing.

The timing varying portion 710 includes a housing rotor 715, which has a tubular portion 716. The tubular portion 716 has a cylindrical shape as a whole. The intake-side cam sprocket 701, which is an annular outer tooth sprocket, is fixed to the outer wall of the tubular portion 716 of the housing rotor 715. The inner edge of the intake-side cam sprocket 701 is fixed to the outer wall of the tubular portion 716. The housing rotor 715 thus rotates integrally with the intake-side cam sprocket 701. Multiple (three in the present embodiment) partition walk 717 protrude radially inward from the inner wall of the tubular portion 716. The protruding lengths of the partition walls 717 are the same. An accommodation chamber 718 is defined between the partition walls 717 of each circumferentially adjacent pair. Each partition wall 717 has a partition sealing portion 717S at the distal end on the protruding side.

The housing rotor 715 accommodates a vane rotor 711, which rotates integrally with the intake camshaft 70. The vane rotor 711 has a boss 712, which constitutes the central part in the radial direction and is fixed to the end of the intake camshaft 70. The boss 712 has multiple vanes 713 protruding radially outward. The number of the vanes 713 corresponds to the number of the partition walls 717 (three in the present embodiment). The protruding length of the vanes 713 is the same as the protruding length of the partition walls 717. Each vane 713 is located between adjacent two of the partition walls 717 in the housing rotor 715. Each vane 713 has a vane sealing portion 713S at the distal end on the protruding side. The vane sealing portion 713S seals the gap between the vane 713 and the tubular portion 716. Also, the outer circumferential surface of the boss 712 is in contact with the partition sealing portion 717S of each partition wall 717, which seals the gap between the boss 712 and the partition wall 717.

The accommodation chamber 718 in the housing rotor 715 is divided into two hydraulic chambers by the vane 711 of the vane rotor 713 located radially inside the housing rotor 715. In the accommodation chamber 718, the hydraulic chamber on the trailing side of the vane 713 in the rotation direction of the intake camshaft 70 is a phase advancing chamber 719, which performs as a phase advancing hydraulic chamber. In the accommodation chamber 718, the hydraulic chamber on the leading side of the vane 713 in the rotation direction of the intake camshaft 70 is a phase retarding chamber 720, which performs as a phase retarding hydraulic chamber.

Figure 4:
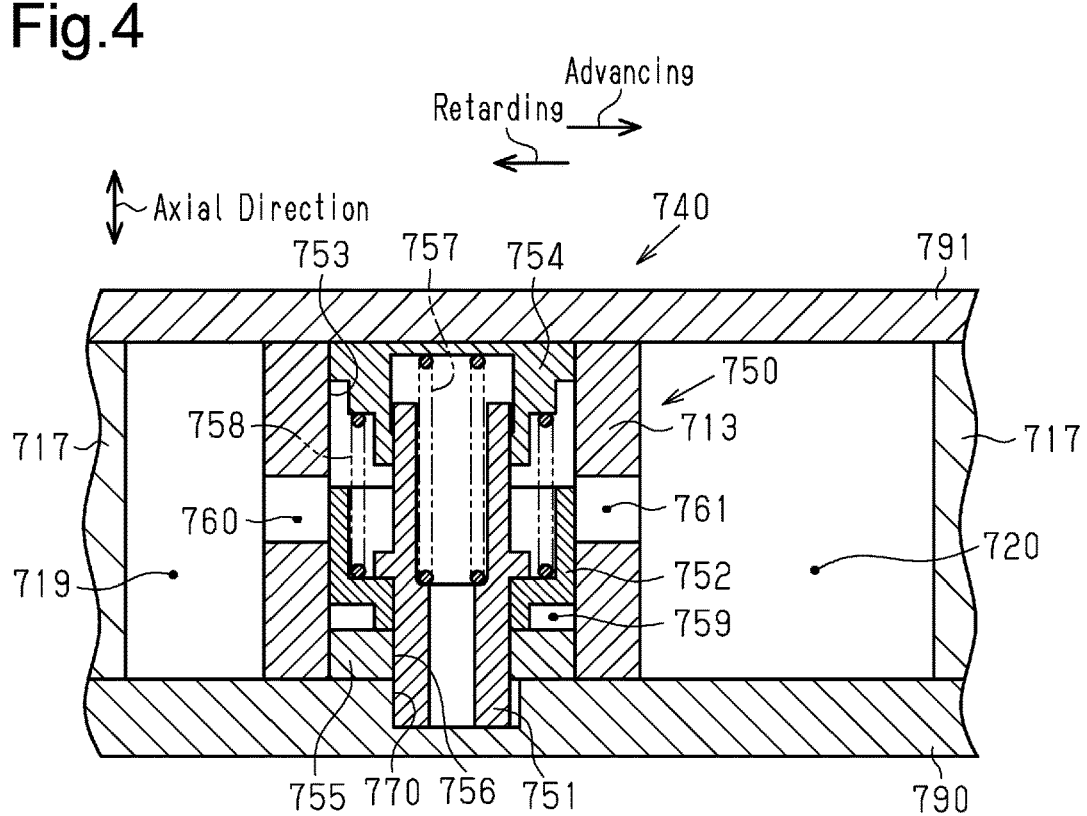
FIG. 4 is a cross-sectional view taken along line 4-4 in FIG. 3, showing a state in which an intermediate locking portion kicks an intake-side relative rotation phase at an intermediate phase.
Figure 5:
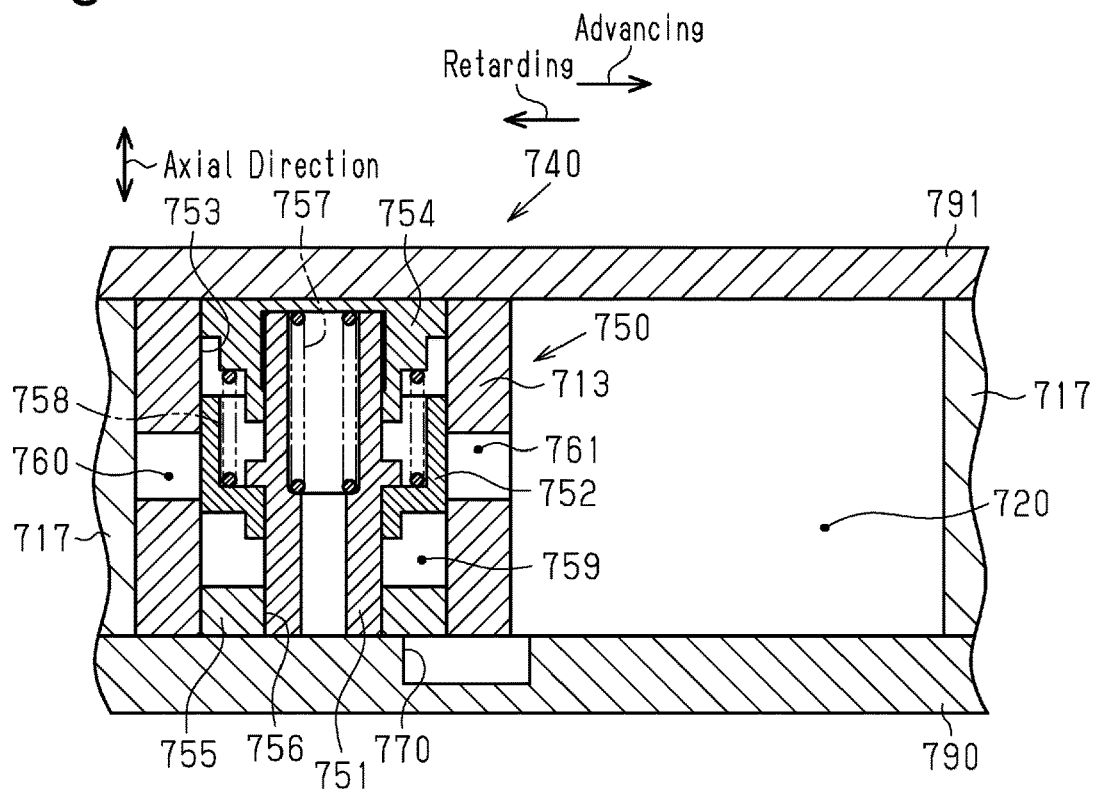
FIG. 5 is a cross-sectional view showing a state in which the intake-side relative rotation phase is retained at the most retarded phase.

As shown in FIGS. 4 and 5, the opening on one side of the housing rotor 715, that is, the lower opening in FIG. 4, is closed by a first cover 790. The opening on the other side of housing rotor 715, that is, the upper opening in FIG. 4, is closed by a second cover 791.

In the intake-side variable valve timing mechanism 700, when oil is supplied to the phase retarding chamber 720 and oil is drained from the phase advancing chamber 719, the hydraulic pressure in the phase retarding chamber 720 becomes higher than the hydraulic pressure in the phase advancing chamber 719. In this case, the vane rotor 711 is rotated relative to the housing rotor 715 in the direction opposite to the rotation direction of the intake camshaft 70, that is, in the counterclockwise direction in FIG. 3. Thus, when the relative rotation phase of the vane rotor 711 with respect to the housing rotor 715 is changed, the valve timing of the intake valve 43 is retarded with respect to the crankshaft 10. In the following description, the relative rotation phase of the intake camshaft 70 with relative to crankshaft 10 will be referred to as an intake-side relative rotation phase.

When oil is supplied to the phase advancing chamber 719 and oil is drained from the phase retarding chamber 720, the hydraulic pressure in the phase advancing chamber 719 becomes higher than the hydraulic pressure in the phase retarding chamber 720. In this case, the vane rotor 711 is rotated relative to the housing rotor 715 in the rotation direction of the intake camshaft 70 (in the clockwise direction in FIG. 3). When the intake-side relative rotation phase is changed as described above, the valve timing of the intake valve 43 is advanced.

As shown in FIG. 3, the intermediate locking portion 740 is provided in each of two of the vanes 713 of the vane rotor 711. The intermediate locking portion 740 is a mechanism that retains the intake-side relative rotation phase at an intermediate phase set between the most retarded phase and the most advanced phase. The most retarded phase is the relative rotation phase when the valve timing is most retarded, and the most advanced phase is the relative rotation phase when the valve timing is most advanced. In addition, when the intake-side relative rotation phase is retained at the intermediate phase, the valve timing of the intake valve 43 is retained at the intermediate timing between the most retarded timing and the most advanced timing. Since the configurations of the two intermediate locking portions 740 are identical, the description of one of the intermediate locking portions 740 is omitted.

As shown in FIGS. 4 and 5, the intermediate locking portion 740 basically includes a pin moving portion 750, which is configured to protrude and accommodate a locking pin, and an intermediate locking hole, which is configured to receive the pin protruding from the pin moving portion 750. The pin moving portion 750 includes a cylindrical inner pin 751 and an annular outer pin 752 arranged on the outer circumference of the inner pin 751. The outer pin 752 is slidable relative to the inner pin 751 in the axial direction of intake camshaft 70, that is, in the vertical direction in FIG. 4. The inner pin 751 and the outer pin 752 are accommodated in an accommodation hole 753 in the vane 713.

In the accommodation hole 753, a spring guide bushing 754 having a cylindrical shape is fixed to the opening adjacent to the second cover 791 of the accommodation hole 753, that is, the upper opening in FIG. 4. The outer wall of the spring guide bushing 754 is in contact with the inner wall of the opening that is adjacent to the second cover 791 of the accommodation hole 753, and closes the opening of the accommodation hole 753. In the accommodation hole 753, a ring bushing 755 having a cylindrical shape is fixed to the opening adjacent to the first cover 790 of the accommodation hole 753, that is, the lower opening in FIG. 4. The outer wall of the ring bushing 755 is in contact with the inner wall of the opening of the accommodation hole 753 that is adjacent to the first cover 790. The ring bushing 755 has a circular hole 756 at the center. The circular hole 756 extends through the ring bushing 755 and has a size sufficient for the inner pin 751 to pass through.

Also, an inner pin spring 757 is accommodated between the inner pin 751 and the spring guide bushing 754. The inner pin spring 757 urges the inner pin 751 toward the first cover 790. Also, an outer pin spring 758 is accommodated between the outer pin 752 and the spring guide bushing 754. The outer pin spring 758 urges the outer pin 752 toward the first cover 790.

An unlocking chamber 759 is defined between the outer pin 752 and the ring bushing 755. When oil is supplied to the unlocking chamber 759 to increase the hydraulic pressure in the unlocking chamber 759, the outer pin 752 is allowed to be movable toward the second cover 791 against the urging force of the outer pin spring 758. When the outer pin 752 is displaced toward the second cover 791, the inner pin 751 can be displaced toward the second cover 791 against the urging force of the inner pin spring 757.

The vane 713 has a phase advancing chamber continuous passage 760. The accommodation hole 753 and the phase advancing chamber 719 are continuous with each other through the phase advancing chamber continuous passage 760. The vane 713 also has a phase retarding chamber continuous passage 761. The accommodation hole 753 and the phase retarding chamber 720 are continuous with each other through the phase retarding chamber continuous passage 761. The phase advancing chamber continuous passage 760 and the phase retarding chamber continuous passage 761 are provided at positions where, when the outer pin 752 is closest to the second cover 791, the passages 760 and 761 are completely closed by the outer pin 752, and when the outer pin 752 is closest to the first cover 790, the passages 760 and 761 are partly closed by the outer pin 752 and open. Therefore, when the outer pin 752 is displaced toward the second cover 791, the phase advancing chamber continuous passage 760 and the phase retarding chamber continuous passage 761 are disconnected from each other by the outer pin 752. When the hydraulic pressure of the unlocking chamber 759 is reduced and the outer pin 752 is displaced toward the first cover 790, the phase advancing chamber 719 and the phase retarding chamber 720 are continuous with each other.

The intermediate locking portion 740 includes an intermediate locking hole 770, which is recessed in the surface of the first cover 790 that is adjacent to the pin moving portion 750. The intermediate locking hole 770 is cylindrical and has a diameter that is slightly larger than the diameter of the inner pin 751. The intermediate locking hole 770 is arranged at a position where the inner pin 751 of the pin moving portion 750 protrudes when an intake-side rotation phase becomes the intermediate phase.

As shown in FIG. 4, when the intake-side rotation phase of the intermediate locking portion 740 is the intermediate phase, the inner pin 751 is protruded from the accommodation hole 753 toward the first cover 790 by the urging force of the inner pin spring 757. The inner pin 751 enters the intermediate locking hole 770. Thus, the relative rotation of the vane rotor 711 with respect to the housing rotor 715 is restricted by the inner pin 751 being engaged with the intermediate locking hole 770, so that the intake-side relative rotation phase is locked at the intermediate phase.

As shown in FIG. 3, the vane rotor 711 has an atmospheric open passage 714. The atmospheric open passage 714 extends radially inward from the accommodation hole 753 in the vane 713 and opens in the inner wall of the boss 712. That is, the accommodation hole 753 of the vane 713 is continuous with the outside of the intake-side variable valve timing mechanism 700 (radially inner side of the vane rotor 711) through the atmospheric open passages 714. The opening of the atmospheric open passage 714 that is adjacent to the accommodation hole 753 is located at a position where the opening is closed by the outer pin 752 when the outer pin 752 is displaced toward the second cover 791. That is, when the outer pin 752 is displaced toward the second cover 791, the atmospheric open passage 714 and the accommodation hole 753 are disconnected from each other by the outer pin 752. When the hydraulic pressure of the unlocking chamber 759 is reduced and the outer pin 752 is displaced toward the first cover 790, the atmospheric open passage 714 and the accommodation hole 753 are continuous with each other.

The oil drawn in from the oil pan 20 by the oil pump 21 is supplied to several sections including the intake-side variable valve timing mechanism 700 through the oil control valve 72 attached to the intake-side variable valve timing mechanism 700. Although not illustrated, the oil control valve 72 is configured by a housing having ports and a spool provided in the housing. In the present embodiment, the housing of the oil control valve 72 includes multiple components that are coupled together in the axial direction.

An electromagnetic solenoid (not shown) is attached to the oil control valve 72. Displacement of the spool in the housing in the axial direction due to an electromagnetic three of the electromagnetic solenoid and an urging force of the spring controls the manner in which oil is supplied to and drained from the phase advancing chamber 719, the phase retarding chamber 720, and the unlocking chamber 759.

The oil control valve 72 is operated in one of multiple operation modes by changing the manner in which oil is supplied and drained according to parameters of the internal combustion engine E such as the operating state of the internal combustion engine E. The operation modes of the oil control valve 72 include an intermediate locking mode, an oil filling mode, a phase advancing mode, a retaining mode, and a phase retarding mode as described below.

In the intermediate locking mode, oil supply and drainage to and from both the phase advancing chamber 719 and the phase retarding chamber 720 are stopped, and the oil is drained from the unlocking chamber 759. This reduces the hydraulic pressure of the unlocking chamber 759, so that the outer pin 752 is displaced toward the first cover 790. The inner pin 751 is thus able to protrude from the accommodation hole 753. Therefore, when the intake-side relative rotation phase is the intermediate phase as shown in FIG. 4, the inner pin 751 is engaged with the intermediate locking hole 770, so that the intake-side relative rotation phase is locked at the intermediate phase. Also, since the outer pin 752 is displaced toward the first cover 790, the atmospheric open passage 714 and the accommodation hole 753 are continuous with each other.

In the oil filling mode, oil is supplied to the phase advancing chamber 719. At the same time, drainage of oil from the phase retarding chamber 720 is stopped, and oil is drained from the unlocking chamber 759. This reduces the hydraulic pressure of the unlocking chamber 759, so that the outer pin 752 is displaced toward the first cover 790. Accordingly, the phase advancing chamber 719 and the phase retarding chamber 720 are continuous with each other, so that the oil supplied to the phase advancing chamber 719 flows into the phase retarding chamber 720. Therefore, as the phase advancing chamber 719 and the phase retarding chamber 720 are filled with oil quickly, the intake-side variable valve timing mechanism 700 becomes ready to operate. Also, since the outer pin 752 is displaced toward the first cover 790, the atmospheric open passage 714 and the accommodation hole 753 are continuous with each other. As a result, in the oil filling mode, some of the oil supplied to the phase advancing chamber 719 leaks outside via the atmospheric open passage 714.

In the phase advancing mode, oil is supplied to the phase advancing chamber 719. At the same time, oil is drained from the phase retarding chamber 720 and supplied to the unlocking chamber 759. In this case, since the hydraulic pressure of the phase advancing chamber 719 is higher than the hydraulic pressure of the phase retarding chamber 720, the intake-side relative rotation phase is advanced, and the valve timing of the intake valve 43 is advanced. In addition, since the hydraulic pressure of the unlocking chamber 759 is increased, the inner pin 751 is accommodated in the accommodation hole 753. Thus, the locking of the intake-side relative rotation phase by the intermediate locking portion 740 is canceled. When the hydraulic pressure of the unlocking chamber 759 is increased, the outer pin 752 is displaced toward the second cover 791. Accordingly, the atmospheric open passage 714 and the accommodation hole 753 are disconnected from each other.

In the intermediate locking mode, oil supply and drainage to and from both the phase advancing chamber 719 and the phase retarding chamber 720 are stopped, and the oil is supplied to the unlocking chamber 759. In this case, since the hydraulic pressure of the phase advancing chamber 719 and the phase retarding Chamber 720 is not changed, the intake-side relative rotation phase is not changed, and the valve timing of the intake valve 43 is maintained. In addition, since the hydraulic pressure of the unlocking chamber 759 is increased, the inner pin 751 is accommodated in the accommodation hole 753. Thus, the locking of the relative rotation phase by the intermediate locking portion 740 is canceled. That is, in the retaining mode, the intake-side relative rotation phase is retained by retaining the hydraulic pressure of the phase advancing chamber 719 and the phase retarding chamber 720, unlike the locking mode. Since the retaining of the intake-side relative rotation phase by the inner pin 751 is cancelled, switching the mode to the phase advancing mode or the phase retarding mode, which will be discussed below, allows the vane 713 to rotate quickly, and the valve timing is changed quickly. The retaining mode is selected when retaining the valve tinning during, for example, the engine operation, or when unlocking the valve timing being locked by the intermediate locking portion 740. When the hydraulic pressure of the unlocking chamber 759 is increased, the outer pin 752 is displaced toward the second cover 791. Accordingly, the atmospheric open passage 714 and the accommodation hole 753 are disconnected from each other.

In the phase retarding mode, oil is supplied to the phase retarding chamber 720. At the same time, oil is drained from the phase advancing chamber 719 and supplied to the unlocking chamber 759. In this case, since the hydraulic pressure of the phase retarding chamber 720 is higher than the hydraulic pressure of the phase advancing chamber 719, the intake-side relative rotation phase is retarded, and the valve timing of the intake valve 43 is retarded. In addition, since the hydraulic pressure of the unlocking chamber 759 is increased, the inner pin 751 is accommodated in the accommodation hole 753. Thus, the locking of the intake-side relative rotation phase by the intermediate locking portion 740 is canceled. The phase retarding mode is selected, for example, when retarding the valve timing. When the hydraulic pressure of the unlocking chamber 759 is increased, the outer pin 752 is displaced toward the second cover 791. Accordingly, the atmospheric open passage 714 and the accommodation hole 753 are disconnected from each other.

Figure 6:
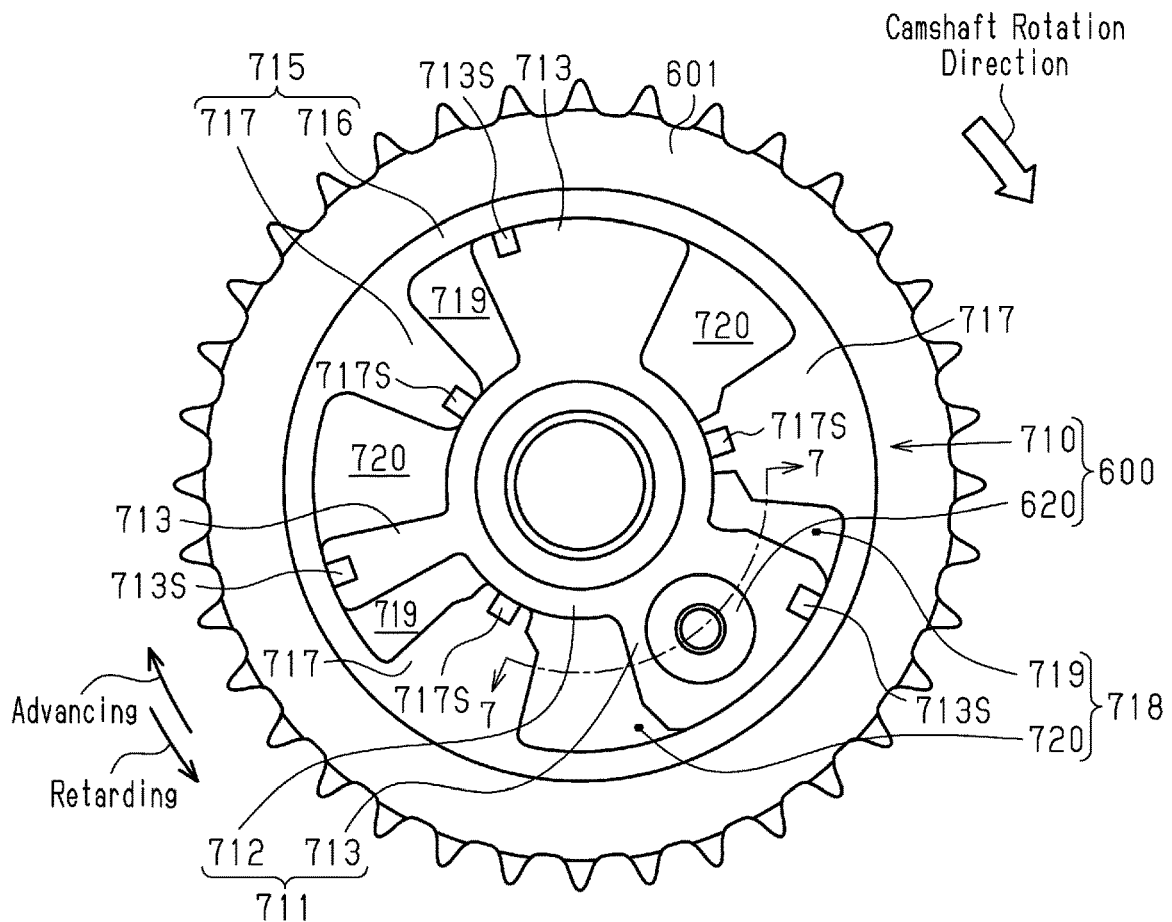
FIG. 6 is a plan view schematically showing the internal structure of an exhaust-side variable valve timing mechanism.

The exhaust-side variable valve timing mechanism 600 of the present embodiment will now be described with reference to FIGS. 6 and 7. As shown in FIG. 6, when viewed from the first side in the axial direction of the exhaust camshaft 60, the exhaust-side variable valve timing mechanism 600 has a substantially circular shape. The exhaust-side variable valve timing mechanism 600 basically includes a timing varying portion 710 and a locking portion 620. The timing varying portion 710 changes the valve timing, or the opening/closing timing, of the exhaust valve 32. The locking portion 620 retains the valve timing of the intake valve 43 at the most retarded timing. Since the configuration of the timing varying portion 710 is the same as the timing varying portion 710 of the intake-side variable valve timing mechanism 700, the same reference numerals are given and the detailed description is omitted. However, the cam sprocket attached to the timing varying portion 710 of the exhaust-side variable valve timing mechanism 600 is denoted as the exhaust-side cam sprocket 601.

In the exhaust-side variable valve timing mechanism 600, when oil is supplied to the phase retarding chamber 720 and oil is drained from the phase advancing chamber 719, the hydraulic pressure in the phase retarding chamber 720 becomes higher than the hydraulic pressure in the phase advancing chamber 719. In this case, the vane rotor 711 is rotated relative to the housing rotor 715 in the direction opposite to the rotation direction of the exhaust camshaft 60 (the counterclockwise direction in FIG. 6). Thus, when the relative rotation phase of the vane rotor 711 with respect to the housing rotor 715 is changed, the valve timing of the exhaust valve 32 is retarded with respect to the crankshaft 10. In the following description, the relative rotation phase of the exhaust camshaft 60 with relative to crankshaft 10 will be referred to as an exhaust-side relative rotation phase.

As shown in FIG. 6, the locking portion 620 is provided in one of the vanes 713 of the vane rotor 711. The locking portion 620 retains the exhaust-side relative rotation phase at the most retarded phase.

Figure 7:
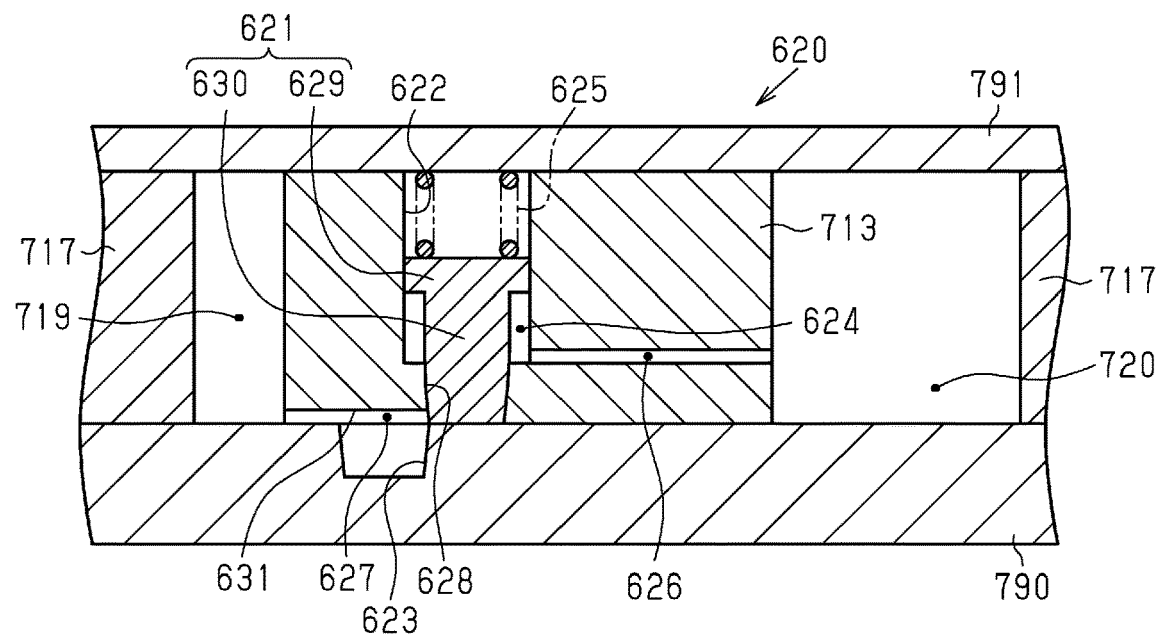
FIG. 7 is a cross-sectional view taken along line 7-7 in FIG. 6, showing a state in which an exhaust-side relative rotation phase is retained between the most retarded rotation phase and the most advanced rotation phase.

As shown in FIG. 7, the opening on one side of the housing rotor 715, that is, the lower opening in FIG. 7, is closed by a first cover 790. The opening on the other side of housing rotor 715, that is, the upper opening in FIG. 7, is closed by a second cover 791.

The locking portion 620 has a cylindrical accommodation hole 622, which is recessed in the surface adjacent to the second cover 791 of the vane 713. The accommodation hole 622 accommodates a locking pin 621. The locking pin 621 basically includes a large diameter portion 629 and a small diameter portion 630. The large diameter portion 629 is arranged to face the second cover 791 and has a cylindrical shape that has approximately the same diameter as the inner diameter of the accommodation hole 622. The small diameter portion 630 protrudes toward the first cover 790 from the surface of the large diameter portion 629 that faces the first cover 790. The small diameter portion 630 has a cylindrical shape with a diameter smaller than that of the large diameter portion 629. A locking spring 625, which urges the locking pin 621 toward the first cover 790, is accommodated between the surface of the large diameter portion 629 that is adjacent to the second cover 791 and the inner wall of the second cover 791. A through-hole 628 extends through the wall of the accommodation hole 622 that is adjacent to the first cover 790. The small diameter portion 630 of the locking pin 621 extends through the through-hole 628.

The locking portion 620 has an unlocking chamber 624, which is defined by the lower surface of the large diameter portion 629, the side surface of the small diameter portion 630, and the inner wall of the accommodation hole 622. Also, the vane 713 has a phase retarding continuous passage 626, through which the unlocking chamber 624 and the phase retarding chamber 720 are continuous with each other. Furthermore, the vane 713 has a recess 631, which is located in the surface that faces the first cover 790 and recessed toward the second cover 791. The recess 631 and the inner wall of the first cover 790 define a phase advancing continuous passage 627, through which the through-hole 628 and the phase advancing chamber 719 are continuous with each other.

The locking pin 621 moves in the direction of protruding from the vane 713 or in the direction of retarding into the vane 713 based on the relationship between the hydraulic pressure of the unlocking chamber 624 and the force of the locking spring 625. The hydraulic pressure of the unlocking chamber 624 acts on the locking pin 621 in the direction of retraction into the vane 713. The force of the locking spring 625 acts on the locking pin 621 in a direction of protrusion from the vane 713.

The first cover 790 has a locking hole 623, which is recessed into the inner wall. The locking hole 623 is cylindrical and has a diameter that is slightly larger than the diameter of the locking pin 621. The locking hole 623 is located at a position where the locking pin 621 protruding from the vane 713 engages when the exhaust-side relative rotation phase becomes the most retarded phase.

The oil drawn in from the oil pan 20 by the oil pump 21 is supplied to several sections including the exhaust-side variable valve timing mechanism 600 through the oil control valve 62 attached to the exhaust-side variable valve timing mechanism 600. Since the configuration of the oil control valve 62 is the same as that of the oil control valve 72 attached to the exhaust-side variable valve timing mechanism 600, the description of the oil control valve 62 is omitted. The oil control valve 62 attached to the exhaust-side variable valve timing mechanism 600 is operated in one of multiple operation modes by changing the manner in which oil is supplied and drained according to parameters of the internal combustion engine E such as the operating state of the internal combustion engine E. The operation modes of the oil control valve 62 include, for example, a phase advancing mode, a retaining mode, and a phase retarding mode as described below.

In the phase advancing mode, oil is supplied to the phase advancing chamber 719 and the phase advancing continuous passage 627, and oil is drained from the phase retarding chamber 720 and the phase retarding continuous passage 626. In this case, since the hydraulic pressure of the phase advancing chamber 719 is higher than the hydraulic pressure of the phase retarding chamber 720, the exhaust-side relative rotation phase is advanced, and the valve timing of the exhaust valve 32 is advanced. When oil of the phase retarding chamber 720 is drained, oil is also drained from the phase retarding continuous passage 626 and the unlocking chamber 624, which are continuous with the phase retarding chamber 720. When the oil is drained from the unlocking chamber 624, the locking pin 621 is able to be displaced toward the first cover 790.

In the phase retarding mode, oil is drained from the phase advancing chamber 719 and the phase advancing continuous passage 627, and oil is supplied to the phase retarding chamber 720 and the phase retarding continuous passage 626. In this case, since the hydraulic pressure of the phase retarding chamber 720 is higher than the hydraulic pressure of the phase advancing chamber 719, the exhaust-side relative rotation phase is retarded, and the valve timing of the exhaust valve 32 is retarded. When oil is supplied to the phase retarding chamber 720, oil is also supplied to the phase retarding continuous passage 626 and the unlocking chamber 624, which are continuous with the phase retarding chamber 720. When the oil is supplied to the unlocking chamber 624, the locking pin 621 is displaced toward the second cover 791.

In the retaining mode, oil supply and drainage to and from both the phase advancing chamber 719 and the phase retarding chamber 720 are stopped. In this case, since the hydraulic pressure of the phase advancing chamber 719 and the phase retarding chamber 720 is not changed, the exhaust-side relative rotation phase is not changed, and the valve timing of the exhaust valve 32 is maintained.

As shown in FIG. 1, in the internal combustion engine E, the oil pump 21 is connected to an oil passage 130 through which the oil pumped up by the oil pump 21 flows. The oil passage 130 is configured by a tubular passage (pipe) and passages defined in the cylinder block CB and the cylinder head CH, but is schematically shown in FIG. 1. The upstream end of the oil passage 130 is connected to the oil pump 21, and the downstream end is continuous with the oil pan 20.

An exhaust-side connection passage 131 is connected to the middle of oil passage 130. The exhaust-side connection passage 131 conducts oil to the exhaust-side variable valve timing mechanism 600. The exhaust-side connection passage 131 branches from the oil passage 130. The exhaust-side connection passage 131 has a first end connected to the oil passage 130 and a second end connected to the oil control valve 62 of the exhaust-side variable valve timing mechanism 600. The oil passage 130 is connected to a jet connection passage 132 configured to conduct oil to the oil jet 240, which sprays oil. The jet connection passage 132 branches from a section of the oil passage 130 at the downstream side of the point from which the exhaust-side connection passage 131 branches. The jet connection passage 132 has a first end connected to the oil passage 130 and a second end connected to the oil jet 240. In addition, the oil passage 130 is connected to an intake-side connection passage 133 configured to conduct oil to the intake-side variable valve timing mechanism 700. The intake-side connection passage 133 branches from a section of the oil passage 130 at the downstream side of the point from which the jet connection passage 132 branches. The intake-side connection passage 133 has a first end connected to the oil passage 130 and a second end connected to the oil control valve 72 of the intake-side variable valve timing mechanism 700.

The operation and advantages of the present embodiment will now be described. First, the difference in the leakability of oil between the intake-side variable valve timing mechanism 700 and the exhaust-side variable valve timing mechanism 600 will be described.

In the intermediate locking mode of the intake-side variable valve timing mechanism 700, when the inner pin 751 and the intermediate locking hole 770 engage with each other, the inner pin 751 and the intermediate locking hole 770 may collide with each other and generate collision noise. In the above-described embodiment, oil is supplied to the gap between the inner pin 751 and the intermediate locking hole 770 in order to prevent such collision noise. In intermediate locking mode, the atmospheric open passage 714 and the accommodation hole 753 are continuous with each other. Therefore, when the inner pin 751 is engaged with the intermediate locking hole 770, the oil accumulated in the intermediate locking hole 770 leaks out from the intake-side variable valve timing mechanism 700 from the atmospheric open passage 714 through the gaps between of parts of the intermediate locking portion 740.

When stalling, the internal combustion engine E may stop with the intake-side relative rotation phase retained on the retarded side of the intermediate phase. In such a situation, the intake-side variable valve timing mechanism 700 is controlled in the intermediate locking mode in preparation for restart of the internal combustion engine E. At this time, although not illustrated in detail, the spring in the intake-side variable valve timing mechanism 700 exerts elastic force directed to the intermediate position on the vane rotor 711, so that the intake-side relative rotation phase is chained to the intermediate phase. In the intermediate locking mode, oil supply and drainage is stopped, so that the hydraulic pressure of the unlocking chamber 759 is reduced, and the outer pin 752 is displaced toward the first cover 790. When the outer pin 752 is displaced toward the first cover 790, the phase advancing chamber 719 and the phase retarding chamber 720 are continuous with the atmospheric open passage 714. The phase advancing chamber 719 draws in air from outside the intake-side variable valve timing mechanism 700 through the atmospheric open passage 714. The air drawn into the phase advancing chamber 719 promotes the rotation of the vane rotor 711 toward the phase advancing side. Also, oil remains in the phase retarding chamber 720. The phase retarding chamber 720 drains oil to the outside of the intake-side variable valve timing mechanism 700 through the atmospheric open passage 714. The remaining oil is drained from the phase retarding chamber 720 to promote the rotation of the vane rotor 711 to the phase advancing side. Thus, when the internal combustion engine E is controlled to be in the intermediate locking mode in preparation for restart, for example, after stalling, oil leaks out of the intake-side variable valve timing mechanism 700 in order to speed up the change the intake-side relative rotation phase to the intermediate phase.

Furthermore, the oil filling mode can be selected in intake-side variable valve timing mechanism 700. In the oil filling mode, the atmospheric open passage 714 and the phase advancing chamber 719 are continuous with each other via the accommodation hole 753. Therefore, as oil continues to be supplied to the phase advancing chamber 719, the oil leaks out of the intake-side variable valve timing mechanism 700 via the atmospheric open passage 714.

As described above, the intake-side variable valve timing mechanism 700 is capable of selecting the intermediate locking mode and the oil filling mode, which cannot be selected by the exhaust-side variable valve timing mechanism 600. In the intermediate locking mode, as described above, oil is drained to the outside of the intake-side variable valve timing mechanism 700 when the engine is restarted or when the inner pin 751 is engaged with the intermediate locking hole 770. That is, in the present embodiment, when oil of the same pressure is supplied to operate the exhaust-side variable valve timing mechanism 600 and the intake-side variable valve timing mechanism 700, the oil leakage of the intake-side variable valve timing mechanism 700 is greater than that of the exhaust-side variable valve timing mechanism 600.

Moreover, in the present embodiment, as an oil control valve that controls the supply and drainage of oil to and from the intake-side variable valve timing mechanism 700, the bolt-type oil control valve 72 is used, which is inserted in the center of the intake-side variable valve timing mechanism 700. Since the oil control valve 72 is allowed to be located significantly close to the intake-side variable valve timing mechanism 700, the oil supply path from the oil control valve 72 to the intake-side variable valve timing mechanism 700 is allowed to be set short. This improves the responsivity of the intake-side variable valve timing mechanism 700. If the clearance between the housing and the spool in the oil control valve 72 is small, the spool may fail to slide smoothly. Therefore, the clearance between the housing and the spool is set relatively large. Thus, when oil is supplied from the oil control valve 72, oil is likely to leak from the clearance between the housing and the spool. As a result, oil leaks from the bolt-type oil control valve 72 in the already leaky intake-side variable valve timing mechanism 700. The amount of oil leakage is thus considerable.

Figure 8:
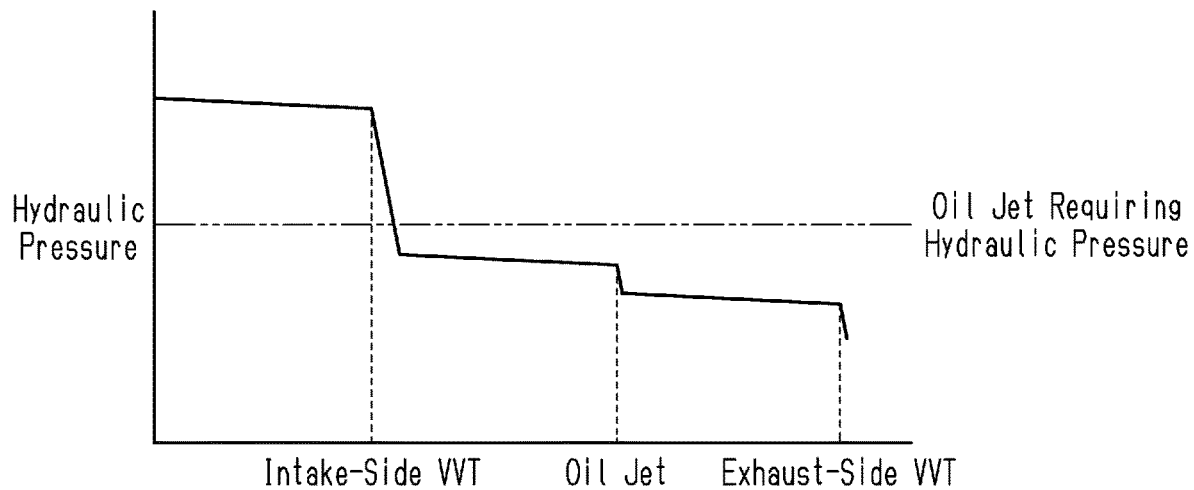
FIG. 8 is a graph showing changes in the hydraulic pressure when an intake-side connection passage is connected to the upstream side of the oil passage and an exhaust-side connection passage is connected to the downstream side of the oil passage.

It is now assumed that the intake-side connection passage 133 configured to conduct oil to intake-side variable valve timing mechanism 700 is connected to the oil passage 130 at the most upstream position among the connection passages 131, 132, 133. Next, it is assumed that the jet connection passage 132 configured to conduct oil to the oil jet 240 is connected to the oil passage 130, and the exhaust-side connection passage 131 configured to conduct oil to the exhaust-side variable valve timing mechanism 600 is connected to the most downstream section of the oil passage 130. In this case, since the intake-side variable valve timing mechanism 700, which is located in the upstream side of the oil passage 130, has a great amount of oil leakage, the hydraulic pressure is significantly reduced as shown FIG. 8. Accordingly, the hydraulic pressure is significantly reduced at the oil jet 240, which is located at the downstream side of the intake-side variable valve timing mechanism 700. As a result, the hydraulic pressure falls below the oil jet requiring hydraulic pressure, which is required to properly operate the oil jet 240. Furthermore, the hydraulic pressure becomes significantly low even in the exhaust-side variable valve timing mechanism 600, which is located in a section of the oil passage 130 at the downstream side of the oil jet 240. The hydraulic pressure is thus insufficient, reducing the responsivity of the exhaust-side variable valve timing mechanism 600 or making the mechanism 600 inoperable.

Figure 9:
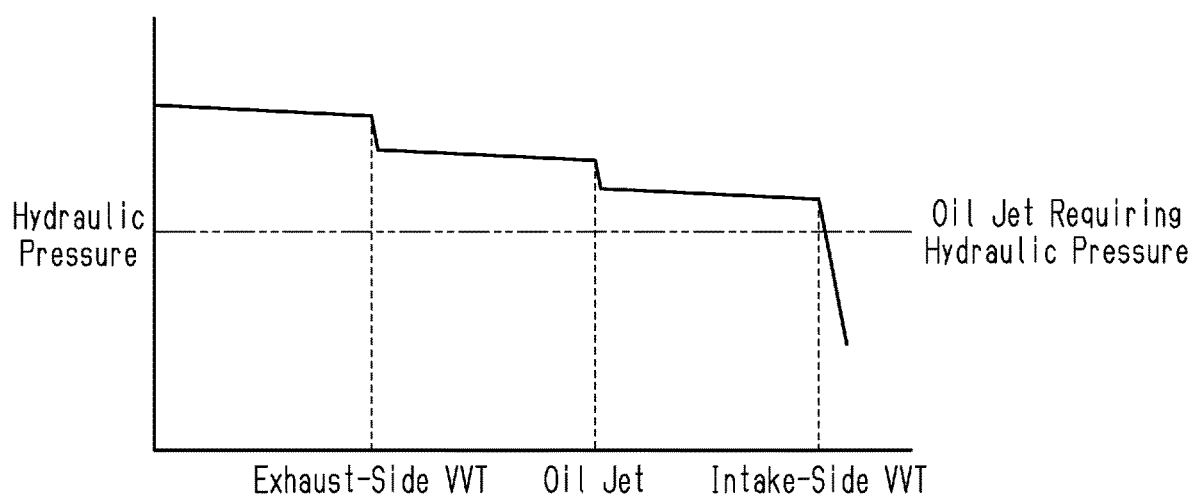
FIG. 9 is a graph showing changes in the hydraulic pressure when the exhaust-side connection passage is connected to the upstream side of the oil passage and the intake-side connection passage is connected to the downstream side of the oil passage.

However, in the present embodiment, the exhaust-side connection passage 131 configured to conduct oil to the exhaust-side variable valve timing mechanism 600 is connected to the oil passage 130 at the most upstream position among the connection passages 131, 132, 133. The jet connection passage 132 configured to conduct oil to the oil jet 240 is connected to the oil passage 130, and the intake-side connection passage 133 configured to conduct oil to the intake-side variable valve timing mechanism 700 is connected to the most downstream section of the oil passage 130. In this case, as shown in FIG. 9, the exhaust-side variable valve timing mechanism 600, which is located in the upstream side of the oil passage 130, leaks less oil than the intake-side variable valve timing mechanism 700. Thus, the reduction in hydraulic pressure is smaller than the reduction in hydraulic pressure the intake-side variable valve timing mechanism 700. This limits excessive insufficiency of hydraulic pressure in the upstream side of the oil passage 130. Therefore, the oil jet 240, which is located at the downstream side of the exhaust-side variable valve timing mechanism 600, is able to maintain a relatively high hydraulic pressure that is higher than the oil jet required hydraulic pressure. The oil jet 240 is allowed to operate properly. Furthermore, oil of a relatively high hydraulic pressure is supplied to the intake-side variable valve timing mechanism 700, which is located at the downstream side of the oil jet 240 in the oil passage 130. This limits hydraulic pressure insufficiency in the intake-side variable valve timing mechanism 700, which is located in the downstream side of the oil passage 130. The responsivity of the intake-side variable valve timing mechanism 700 is thus improved, and the mechanism 700 is prevented from becoming inoperable. In particular, as described above, it is significantly advantageous to employ the oil passage 130 and the configuration of the connection passages on the premise that the oil control valve 72 of the intake-side variable valve timing mechanism 700 is a bolt type.

In the present embodiment, as the crank sprocket 11 rotates clockwise, the timing chain TC is dispensed from the crank sprocket 11, passes through the exhaust-side cam sprocket 601 and intake-side cam sprocket 701, and is returned to the crank sprocket 11. Since the timing chain TC is pulled by the rotation of the crank sprocket 11 between the intake-side earn sprocket 701 and the crank sprocket 11, the tension of the timing chain TC increases. However, since the timing chain TC is dispensed by the rotation of the crank sprocket 11 between the crank sprocket 11 and the exhaust-side earn sprocket 601, the tension of the timing chain TC is reduced. Therefore, the tension of the timing chain TC looped over the intake-side cam sprocket 701 is greater than the tension of the timing chain TC looped over the exhaust-side cam sprocket 601. Therefore, the friction between the intake-side cam sprocket 701 and the timing chain TC is greater than the friction between the exhaust-side cam sprocket 601 and the timing chain TC. That is, the intake-side cam sprocket 701 is more prone to wear than the exhaust-side cam sprocket 601.

In the present embodiment, the intake-side cam sprocket 701 is provided in the leaky intake-side variable valve timing mechanism 700. The intake-side cam sprocket 701 is located farther from the crank sprocket 11 than the exhaust-side cam sprocket 601 in the traveling direction of the timing chain TC. That is, the intake-side cam sprocket 701 is located on the leading side of the exhaust-side cam sprocket 601 with respect to the crank sprocket 11 in the traveling direction of the timing chain TC. In other words, the crank sprocket 11, the exhaust-side cam sprocket 601, and the intake-side cam sprocket 701 are arranged in order in the traveling direction of timing chain TC. The oil leaking from the intake-side variable valve timing mechanism 700 thus reaches the intake-side cam sprocket 701. Therefore, the intake-side cam sprocket 701, which is relatively prone to wear, is readily lubricated with the oil that leaks from the intake-side variable valve timing mechanism 700. As a result, the oil leaking from the intake-side variable valve timing mechanism 700 is used effectively. Since the large friction generated between the intake-side cam sprocket 701 and the timing chain TC is reduced, the wear of the intake-side cam sprocket 701 is reduced.

The above-illustrated embodiment may be modified as follows. The present embodiment and the following modifications can be combined as long as the combined modifications remain technically consistent with each other.

The intake-side cam sprocket 701 may be located closer to the crank sprocket 11 than the exhaust-side cam sprocket 601 in the traveling direction of the timing chain TC. That is, the cam sprocket that has the greater amount of oil leakage may be located closer to the crank sprocket 11 than the cam sprocket that has the smaller amount of oil leakage.

The oil control valves 62 and 72 do not necessarily have to be bolt-types that are inserted into the centers of variable valve timing mechanisms. For example, the oil control valves 62 and 72 may be placed in the cylinder head CH or cylinder block CB, and the oil control valves 62 and 72 may be connected to each variable valve timing mechanism via piping. As described above, bolt-type oil control valves have a relatively great amount of oil leakage. Therefore, the variable valve timing mechanism in which a bolt-type oil control valve is employed is likely to become the variable valve timing mechanism that has the greater amount of oil leakage when operated at the same hydraulic pressure.

The jet connection passage 132 may be connected to a section of the oil passage 130 on the upstream side of the exhaust-side connection passage 131. Also, in addition to the jet connection passage 132, a connection passage configured to conduct oil to an oil shower that supplies oil to, for example, a lash adjuster may be connected to a section of the oil passage 130 at the upstream side of the intake-side connection passage 133. If at least a connection passage such as the jet connection passage 132 is connected to a section at the upstream side of the intake-side connection passage 133, the hydraulic pressure in the jet connection passage 132 and the lash adjuster is prevented from being insufficient. Furthermore, if a high hydraulic pressure is not required for the connection passage such as the jet connection passage 132, the connection passage may be connected to a section at the downstream side of the intake-side connection passage 133.

The jet connection passage 132 may be connected to an oil supply pipe different from the oil passage 130, and the oil passage 130 does not necessarily need to supply oil to the oil jet 240.

The number of the partition walls 717 may be changed. The number of the partition walls 717 may be, for example, two or four. If the number of the partition walls 717 is changed, the number of the vanes 713 is changed accordingly.

The number of the intermediate locking portions 740 may be changed in the intake-side variable valve timing mechanism 700. For example, only one of the three vanes 713 may be provided with the intermediate locking portion 740. Alternatively, all the vanes 713 may each be provided with the intermediate locking portion 740.

The intake-side variable valve timing mechanism 700 may have a structure that cannot be controlled to the intermediate locking mode or the oil filling mode. Specifically, as the intake-side variable valve timing mechanism 700, one with the same structure as the exhaust-side variable valve timing mechanism 600 of the above-described embodiment may be employed.

The exhaust-side variable valve timing mechanism 600 may have a structure that can be controlled to the intermediate locking mode and the oil filling mode. Specifically, as the exhaust-side variable valve timing mechanism 600, one with the same structure as the intake-side variable valve timing mechanism 700 of the above-described embodiment may be employed.

Depending on what structure is adopted as the exhaust-side variable valve timing mechanism 600 or the intake-side variable valve timing mechanism 700 and depending on what structure is adopted as the oil control valve of each variable valve timing mechanism, the exhaust-side variable valve timing mechanism 600 may have a greater amount of oil leakage than the intake-side variable valve timing mechanism 700 when operated by the same hydraulic pressure. In this case, the exhaust-side connection passage 131 of the exhaust-side variable valve timing mechanism 600 should simply be connected to a section of the oil passage 130 at the upstream side of the intake-side connection passage 133 of the intake-side variable valve timing mechanism 700.

The exhaust-side variable valve timing mechanism 600 and the intake-side variable valve timing mechanism 700 may have the same structure. Even if the variable valve timing mechanisms have the same structure and specifications, there may be a difference in the amount of oil leakage due to manufacturing errors and the like. In such a case, the connection passage configured to supply oil to the variable valve timing mechanism that has the greater amount of oil leakage should simply be located in the downstream side of the oil passage 130.

The configurations of the fixed guide 210, the swing guide 220, the tensioner 230, and the chain case 200 may be changed. For example, the position of the pin P for fixing the swing guide 220 may be the on upper side in the longitudinal direction. Also, the position at which the tensioner 230 contacts the swing guide 220 may be on the lower side in the longitudinal direction.

In the internal combustion engine E, the configurations of the cylinder block CB, the oil pan 20, the cylinder head CH, and the cylinder head cover HC may be changed. For example, the configuration of the cylinder head CH can be changed in accordance with the number of cylinders C in the cylinder block CB.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An internal combustion engine, comprising:
   a cylinder head;
   an exhaust camshaft built into the cylinder head;
   an intake camshaft built into the cylinder head;
   an exhaust-side variable valve timing mechanism that is attached to an end of the exhaust camshaft and changes an opening/closing timing of an exhaust valve by supply and drainage of oil;
   an intake-side variable valve timing mechanism that is attached to an end of the intake camshaft and changes an opening/closing timing of an intake valve by supply and drainage of oil, wherein the intake-side variable valve timing mechanism has an atmospheric open passage, which is configured to be selectively opened and closed, and oil in the intake-side variable valve timing mechanism leaks out via the atmospheric open passage when the atmospheric open passage is opened;
   an oil passage that is defined in the cylinder head and through which oil pumped up by an oil pump flows;
   an exhaust-side connection passage that is connected to the oil passage and branches from the oil passage to conduct oil to the exhaust-side variable valve timing mechanism; and
   an intake-side connection passage that is connected to the oil passage and branches from a section of the oil passage at a downstream side of the exhaust-side connection passage to conduct oil to the intake-side variable valve timing mechanism,
   wherein, when oil having a same hydraulic pressure is supplied to the exhaust-side variable valve timing mechanism and the intake-side variable valve timing mechanism to operate the exhaust-side variable valve timing mechanism and the intake-side variable valve timing mechanism, a hydraulic pressure reduction in the intake-side variable valve timing mechanism is greater than a hydraulic pressure reduction in the exhaust-side variable valve timing mechanism due to oil leakage from the intake-side variable valve timing mechanism via the atmospheric open passage.

2. The internal combustion engine according claim 1, further comprising:
an exhaust-side cam sprocket fixed to the end of the exhaust camshaft;
an intake-side cam sprocket fixed to the end of the intake camshaft;
a crank sprocket fixed to an end of a crankshaft; and
a timing chain that is looped over the exhaust-side cam sprocket, the intake-side cam sprocket, and the crank sprocket, and transmits rotational torque, wherein
of an exhaust side and an intake side, a side at which the exhaust-side variable valve timing mechanism is provided is defined as an upstream side, and a side at which the intake-side variable valve timing mechanism is provided is defined as a downstream side, and
the cam sprocket in the downstream side is located farther from the crank sprocket than the cam sprocket in the upstream side in a traveling direction of the timing chain.

3. The internal combustion engine according to claim 1, further comprising oil control valves that are respectively connected to the exhaust-side variable valve timing mechanism and the intake-side variable valve timing mechanism to control supply and discharge of oil,
wherein the intake-side variable valve timing mechanism has a center in a radial direction, and the oil control valve connected to the intake-side variable valve timing mechanism is located at the center in the radial direction of the intake-side variable valve timing mechanism.

4. The internal combustion engine according to claim 1, further comprising a jet connection passage that conducts oil to an oil jet that is arranged in the oil passage and sprays oil,
wherein the jet connection passage is located at an upstream side in the oil passage of the one of the intake-side connection passage and the exhaust side connection passage that conducts oil to the intake-side variable valve timing mechanism.

* * * * *